Figure 1:
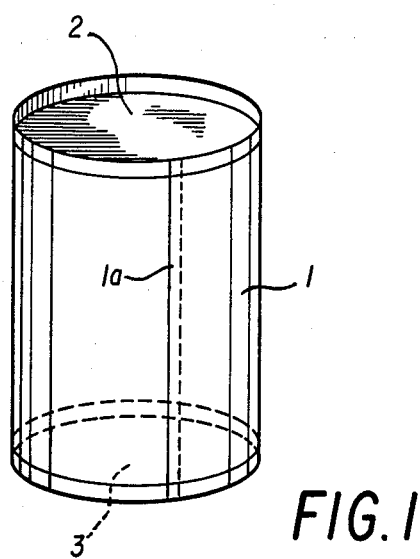

United States Patent [19]

Christensson

[11] Patent Number: 4,599,123
[45] Date of Patent: Jul. 8, 1986

[54] METHOD AND APPARATUS FOR MANUFACTURING A CONTAINER HAVING AN INNER END CLOSURE

[75] Inventor: Od W. Christensson, Järfälla, Sweden

[73] Assignee: Esselte PAC Aktiebolag, Sweden

[21] Appl. No.: 414,056

[22] Filed: Sep. 2, 1982

[51] Int. Cl.⁴ ............................ B65B 7/00; B32B 31/00
[52] U.S. Cl. ........................................ 156/69; 156/73.1;
156/273.7; 156/275.1; 156/275.7; 53/361;
53/362; 53/328; 53/489; 493/109; 229/3.5 MF;
229/5.8
[58] Field of Search ............................ 156/69, 73.1, 73.5,
156/275.1, 275.7, 277.2, 273.7, 580.1, 581,
583.1, 261; 229/3.1, 5.8, 3.5 MF; 493/109;
53/361, 362, 348, 324, 328, 487, 489, 373;
118/319

[56] References Cited

U.S. PATENT DOCUMENTS

| | | | |
|---|---|---|---|
| 2,423,965 | 7/1947 | Coyle | 53/362 |
| 2,988,967 | 6/1961 | Dudnick et al. | 156/261 |
| 3,194,479 | 7/1965 | Rumberger | 229/3.1 |
| 3,460,310 | 8/1969 | Adcock et al. | 156/69 |
| 3,520,751 | 7/1970 | Cranfil | 156/261 |
| 4,262,629 | 4/1981 | McConnellogue et al. | 118/318 |
| 4,264,316 | 4/1981 | Knudsen | 156/69 |

FOREIGN PATENT DOCUMENTS 0537732   7/1941   United Kingdom ................. 53/489

Primary Examiner—Edward Kimlin
Assistant Examiner—Merrell C. Cashion, Jr.
Attorney, Agent, or Firm—Larson and Taylor

[57] ABSTRACT

A method and an apparatus for manufacturing a tin-like container comprising a sleeve formed body or jacket (1) and at least one end closure (2, 3), in which the jacket (1) and the end closure or the end closures (2, 3) at the interior side of the container has a layer (5) of a constant heat weldable, high frequence weldable or ultrasonic weldable material, and in which the container is closed under sealed condition in that the end closure (2, 3) is formed with an edge flange extending all around the end closure and is introduced in the jacket (1) and is welded thereto. The introduction of the end closure (2, 3) in the jacket (1) is made by means of a press piston (14) having a press cone (15) which is formed with an expandable means (15d; 29). In the non-expansive condition the expandable means (15d; 29) is located inside of the cone surface, and it is adapted to become expanded before or at the same time as being welded to the innersurface of the container, whereby a resilient additional pressure line is obtained round the entire weld surface and along at least some part of the height of the weld surface.

7 Claims, 14 Drawing Figures

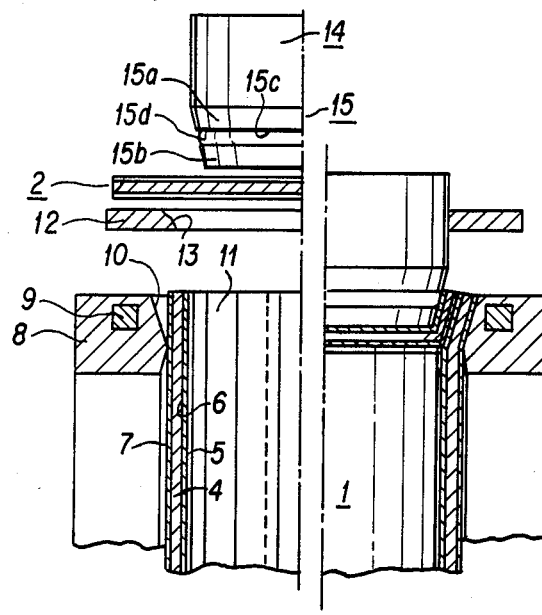
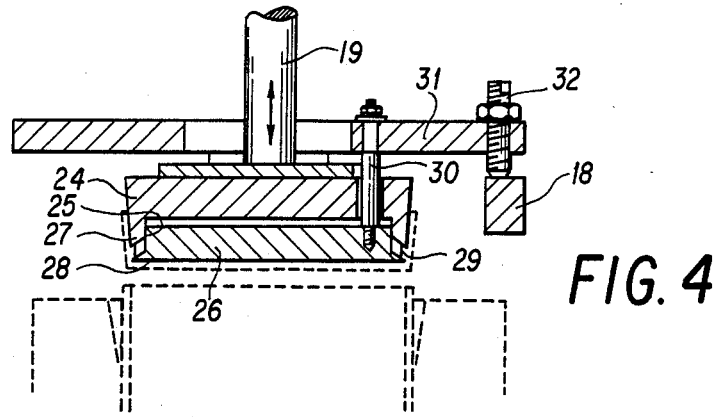
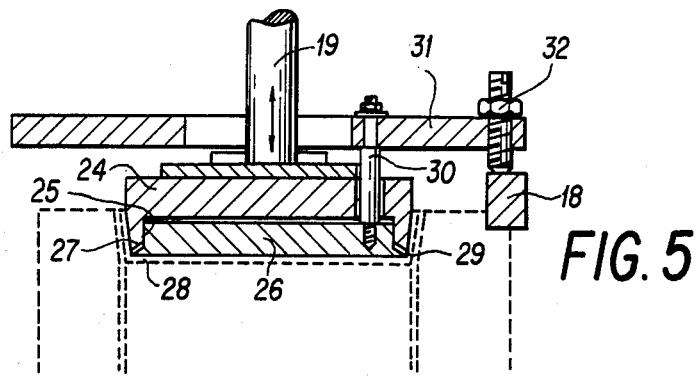

METHOD AND APPARATUS FOR MANUFACTURING A CONTAINER HAVING AN INNER END CLOSURE

The present invention generally is concerned with manufacture of pot-like containers comprising a sleeve formed container body or jacket having at least at one end thereof an end closure, and in which the different parts of the container are made of a material which is suited for being sealed by means of constant heat welding, high frequency welding or ultazonic welding, and in which the end closure is introduced in the open end of the jacket and is secured by such constant heat welding, high frequency welding or ultrasonic welding.

The invention has been developed especially in connection to manufacture of containers having a body of cardboard or similar stiff material which at least at one surface is covered with a heat sealable layer, for instance a weldable plastic layer. It should however be noted that the invention is not restricted to this particular material but is useful for many different types of container materials and many different types and forms of containers.

In the following the invention will mainly be described with reference to pot-like containers made of a material having card-board as a support body, but it is to be understood that the invention is not limited to this special field of containers.

It has been suggested that pot like containers be manufactured by forming a cylindric body or jacket of a plane blank, by punching out one or several end closures, by forming the end closure with an upwardly projecting flange extending round the end closure and by pressing the end closure into the open end of the jacket, whereupon the jacket end is widened to a conical form and the flange of the end closure is connected by means of welding to the inner surface of the cylindrical jacket by means of heated jaws. Since however the time for having the heat penetrate the cardboard material and provide the welding is rather long, the method is slow and therefore expensive.

A method and an apparatus for manufacture of containers of this type also is previously known in which the end closure with the widened flange extending round the end closure is pressed down in the opened end of the jacket by means of a press piston having a peripheral conical surface, whereby the press piston co-operates with a welding tool having a corresponding conical surface, and whereby the press piston is given a predetermined pressure which is maintained until the weldable layers at the outside of the conical surface of the end closure and the inside of the jacket start taking a plastically flowing form. At this stage the press piston is caused to descend a slight distance with substantially the same pressure as previously applied, whereupon the pressure is unloaded while the weld joint is allowed to become cool and stiff. The method is described in connection with high frequency and ultrasonic welding. The said final decending of the press piston preferably is made so far that the total thickness of the combined weld joint between the jacket and the end closure is about the same size as the thickness of one of the weldable layers.

For executing the high frequency welding or ultrasonic welding it is necessary that the material of the cylindrical jacket and the end closure be especially designed and include a material absorbing the high frequency or ultrasonic energy. A material for this purpose may be formed with a supporting body of cardboard, and intermediate layer of aluminum and an outer layer of a weldable plastic material. Such material is rather expensive to manufacture, both depending on the difficulties of laminating the three layers of material together, and also since the high frequency or ultrasonic absoring layer, for instance the aluminum layer, is normally not supplied in such widths as the normal machine widths for manufacture of the supporting cardboard material. Consequently there is some waste material and therefor the triple laminated material is rather expensive.

Whether the welding is made by some form of constant heat welding or by high frequency or ultrasonic welding it is normally necessary that the weldable layers provide a smooth welding surface without such steps which may appear for instance when the container jacket is made of a planar blank which is formed to a tubular body by means of an overlap joint. Therefore there is generally a need that the longitudinal or axial joint be designed as some type of butt joint or in any other way so that the jacket gets a unitary thickness of material round the entire jacket tube. This may cause problems as concerns the manufacture, and even if the jacket is formed accordingly, it may happen that a small stepped landings appears which provides a slight leakage or a bad weld joint and a subsequent risk of leakage in the said stepped landing after the end closure has been welded to the landing.

The method also requires a relatively high degree of accuracy both as concerns the thickness of material in the jacket and in the end closure and as concerns the adjustment of the press piston movement towards the carrier of the container jacket. An increase of the thickness of material and the two snug movement of the press piston to the jacket carrier gives a two thin weld joint. A reduced thickness of material and a too slight movement of the press piston to the jacket holder, in turn, results in insufficient contact between the weldable layers of material, and in both cases there is a risk that leakage will appear.

The object of the invention therefore is to solve the problem of providing the method and an apparatus for bottom closing and/or top closing of a container by means of a lid or end closure which is welded to the inner surface of the jacket by means of constant heat welding, high frequency welding or ultrasonic welding. The invention also includes the possibility of partly using a simple and cheap previously known method of welding the container parts by means of heated jaws, whereby still the same quick and effective welding is obtained as in connection to high frequency or ultrasonic welding. Alternatively the welding is made only by high frequency welding or ultrasonic welding.

In the method according to the invention a cylindrical body or jacket is formed by a plane blank, which at least at one side thereof is covered with a weldable layer of material, and an end closure of a weldable foil or any other easily heatable material is punched out and pressed down into the open end of the jacket. Alternate welding methods will be disclosed in the following detailed description.

A characterizing feature of the apparatus according to the invention is that the press piston at the part thereof where the end closure is connected to the jacket by means of constant heat welding or high frequency or ultrasonic welding is formed with an expandable portion which during a certain period of the welding time provides additional resilient compressing of a large or small portion around the entire weld joint. This additional compressing step is sufficient to provide overbridging of possible stepped landings in the weldable material and for eliminating the risk that there is a too soft contact between the two weldable layers even in case of existing stepped landings of the material. The expandable portion of the press piston may be a solid or hollow ring of rubber, synthetic resin or any other material which can be made to expand by providing that the ring is compressed in the axial direction so as to expand in the radial direction, or that the ring is caused to widen or expand by being inflated or in any other way. The welding can be made while moving the press piston down in one stage or, as mentioned above, in two successive steps, whereby the movement of the last step is utilized for expanding the expandable ring or equivalent part of the piston.

According to a first method of the invention, the open end of the jacket is held by a heated carrier, and a thin end closure foil can be held by a likewise heated press piston so that the two weldable layers are partly liquefied when the layers are pressed together. Thereby a momentary welding is obtained when the layers are pressed together. The end closure foil, however, is too weak in and of itself, and to make the end closure stronger, so that the container is formed with an end closure having sufficient strength, a stable end piece is pressed down and is connected to the end closure foil and the upright flange of said foil. The connection of the end piece can be by providing that the end closure foil and the end piece are sprayed with a glue or any other adhering material.

By using a thin and easily formable foil during the first stage of the end closing problems like formation of "floppers", or the like which are easily formed when a thick and heavy piece of material is formed with an edge flange extending round the end closure. According to a second method of the invention the jacket is placed in a high frequency or ultrasonic welding tool, the end piece is pressed into contact with the end of the jacket and high frequency or ultrasonic energy is applied whereby the welding is made very rapidly.

In the following the invention will be described more closely in connection to the accompanying drawings.

In the drawings FIG. 1 diagrammatically and in a perspective view shows a cup-like or pot-like container manufactured according to the method and the apparatus of the invention.

Figures 2A, 2B:
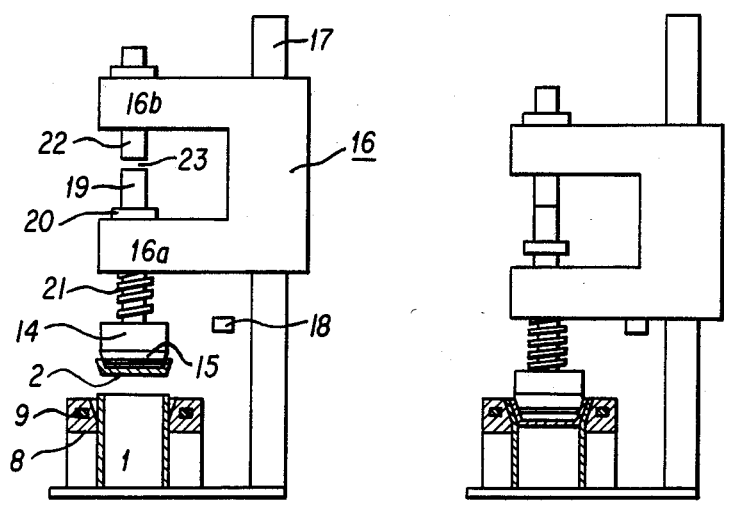

FIGS. 2a and 2b diagrammatically illustrate two different stages in the manufacture of such a pot-like container by means of a simple apparatus according to the invention and FIG. 3 shows, in an enlarged scale, two different cross-section views of the apparatus of FIG. 2 while executing the method.

FIG. 4 shows an example of a part belonging to the apparatus according to the invention in a first stage of the welding operation, and FIG. 5 shows in a corresponding view a second stage of the welding operation.

FIGS. 6a to 6e diagrammatically illustrates some different alternative embodiments of an expandable means utilized in the press piston of the apparatus.

FIGS. 7a to 7e show three different vertical cross-sections corresponding to three stages of the closing of a tubular formed container in an alternative method according to the invention.

The container diagrammatically shown in FIG. 1 may be cylindrical, but it may as well have any other cross-sectional form, preferably a form having rounded corners. The container comprises a sleeve formed body or jacket 1 which at the top is closed with a separate top closure 2 and at the bottom with a separate bottom closure 3. Both the jacket and the top closure 2 and the bottom closure 3 can be made by being punched from a plane container blank which at least at the side intended to be the inner side of the container is formed with a weldable layer. A well suited material is a composite material comprising, as illustrated in FIG. 3, a support material 4 of cardboard, an inner weldable layer 5 of synthetic resin, for instance polyethylene, and an intermediate layer 6 of metal, for instance a thin aluminum foil. Preferably the composite material is also at the side to become the outer side of the container laminated with a protecting plastic layer 7. Other possible materials are different kinds of sheet metal which at least at the side to become the inner side of the container has a layer of plastic or any other layer which can be welded by means of high frequency or ultrasonic energy.

The container is made in that a jacket blank is punched out and is formed to a jacket sleeve which is open at least at one end. The forming of the jacket blank into a sleeve formed jacket preferably is made by a joint 1a extending in the longitudinal direction of the container, but it also can be made by spiral welding of a plane container blank and cutting the spiral wound tube to the intended size. Separately a plane top closure 2 and/or botton closure 3 is punched out, the jacket is mounted in a holder or ring 8, which in the embodiment illustrated in FIG. 3 is a high frequency weld ring of electrically insulating material having an inner annular electrical conduit 9. The ring 8, however, as well can be adapted for ultrasonic welding. The weld ring 8 is formed with an entering cone edge 10 against which the upper end 11 of the jacket is pressed during the welding, and an exit cone edge providing a clearance surface for the ring. The top closure 2 is placed with a weldable material layer thereof, corresponding to layer 5 jacket 1, facing downwardly towards the jacket on top of a formation ring 12 provided a slight distance above the weld ring 8. The formation ring 12 is formed with a through hole 13 having a rounded upper edge. The through hole 13 is matched to the inner form and size of the jacket and to the thickness of material of the top closure 2. Above the formation ring there is a vertically reciprocating conical press piston 14 which, when moving downwards, pushes the top closure 2 through the formation ring 12, whereby the top closure is formed with upwardly projecting peripheral edges in engagement with the surface 15 of the press piston 14. During continued displacement downwards the peripheral edge of the top closure is pressed into engagement with the edge 10 of the weld ring 12. When high frequency current or ultrasonic conical is applied through the conduit 9 the current, or and the ultrasonic energy, passes through the outer plastic layer 7 and the support material 4 and is reflected against the aluminum foil 6 thereby providing heat, so that the weldable layer 5 of the jacket 1 and the corresponding weldable layer of the top closure 2 or the bottom closure 3 respectively melt together. The welding time and the welding energy is adjusted as known to the expeert. The pressure during the welding preferably is adjusted so that the two weldable layers melt together providing a thickness which is half the size or slightly less than half the size of the combined thickness of the two weldable layers. A too soft weld pressure gives a risk of bad press contact and a subsequent lack of tightness, a too strong pressure in turn involves a risk that the weldable material of the layers will be pressed out of the joint, what likewise gives a bad joint and risk that the material is burnt through and that there is short circuiting.

In order to safely ensure that a tight joint is obtained and that no leakages will appear, for instance at the places where the jacket has an overlap joint with a step, or if the top closure should have some slight pucker, wrinkle or fold, the press piston is preferably formed separated, so that the conical surface 15 is divided in an upper cone portion 15a and a lower cone portion 15b and between the said cone portions there is a slit 15c in which an expandable means, for instance an expandable rubber ring or similar means can be mounted. It is of importance that the expandable means is provided and formed so as to be located inside the cone surface 15 in the non-expanded state, whereas in the expanded state it projects at least a slight distance outside the conical surface 15.

As mentioned above the conical press piston 14 (also referred to as the press cone piston) forces the top closure or the bottom closure through the formation ring 12 and into the opened end 11 of the jacket, whereby the said jacket end is widened outwardly and pressed into engagement with the conical edge of the weld ring 8. The pressure is adjusted so that the weldable layers are forced into engagement with each other by predetermined pressure, and preferably the conical press piston is designed so that the piston can be allowed to move a slight distance down when the high frequency current or the ultrasonic energy is applied through the conduit 9 and the two weldable layers melt. By the slight displacement downwards of the press cone piston the two weldable layers are pressed together so that the total thickness of the welded layers is about half the size of the total thickness of the two weldable layers.

Just before the current or the ultrasonic energy is applied through the conduit 9 or at the same time therewith the expandable means 15d is expanded. Preferably the height (width) of the expandable means 15d is less than the height (width) of the weld, whereby a central portion of the weld is pressed with a greater pressure than the remaining portions, so as to safely ensure that no leakages appear in the weld joint. In other words, a part of the height of the common weld surface between the jacket and the end closure rim intermediate the ends of this surface is compressed with greater pressure.

The method is diagrammatically illustrated in FIGS. 2a and 2b. The two figures show a press tool comprising a tool slide 16 which is movable on a column 17 from the upper position shown in FIG. 2a to the press position shown in FIG. 2b. The length of the moment is determined by an adjustable stop pin 18. The tool slide 16 has two extending arms 16a and 16b provided on some distance above each other. The lower arm 16a displaceably carries the press piston 14 on a shaft 19. The movement downwards of the press piston 14 in relation to the tool slide 16 is defined by a shoulder 20 on the shaft 19. Between the press piston 14 and the bottom side of the tool arm 16a there is a pressure spring 21 tending to move the press piston 14 downwardly to its bottom position. The upper tool arm 16b carries an adjustable pin 22 which is mounted to provide a gap 23 to the end of the piston shaft 19, which gap provides to the possibility of the press piston 14 moving downwardly during the welding operation.

In FIG. 4 there is shown a detail of an embodiment of the means for expanding the expandable means. In this case the press piston is formed with an upper piston part 24 which in an inner chamber 25 displaceably receives a cone or conical slide 26. The cone piston part 24 and the cone slide 26 are formed with radial collars 27 and 28 which together with the outer surface of the cone slide provide a cavity in which an expandable ring is mounted. The cone slide 26 is fixedly mounted to a contact bar 31 by means of a pin 30. The contact bar 31 co-operates with the fixed stop pin 18. The upper cone part 24 which is connected to the cone shaft 19 is displaceable in relation to the pin 30. In the non-active state the ring 29 is retracted to a position inside the cone surface, and when moving the piston part 24 downwardly the said piston part together with the top closure and the bottom closure can without obstruction be moved into the jacket end 11. When the contact bar 31 which is adjustable by means of the screw 32 engages the stop pin 18 the downward movement of the cone slide 26 is stopped, but the cone piston part 24 still can be moved a further slight distance down towards the cone slide, whereby the rubber ring 29 is compressed axially and thereby expands radially. The rubber ring 29 accordingly elastically or resiliently presses a part of the weld surfaces together during the welding operation.

FIG. 5 diagrammatically and in an exaggerated view shows the apparatus during the welding with the rubber ring 29 expanded.

The rubber ring 29 can be loosely inserted in the cavity or it can be vulcanized to the collars 27 and 28.

Figures 6A, 6B, 6C, 6D, 6E:
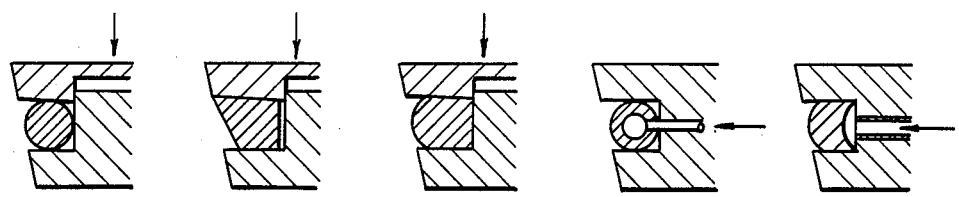

In FIG. 6 there are shown some alternative forms of the expandable means. In FIGS. 6a, b, and c there are shown three solid rubber rings of different cross-sections, in FIG. 6d there is shown a tubular ring which by means of compressed air or in any other way can be pumped up to an extended position, and FIG. 6e diagrammatically shows a ring which can be made to expand by means of air introduced from behind the ring.

It should be noted that in many cases it is necessary to bevel those surfaces of the cone piston part 24 and the cone slide 26 which provide the expansion of the elastical ring 29. If the said surfaces are parallel or converge conically in the outward direction, the elastic ring can be locked in the groove or even be pulled into the groove so that no expansion is obtained. To present this the said surfaces should be at least slightly conically widened in the direction radially outward in relation to each other, i.e., so that the space defined therebetween gradually increases in the radial direction; as indicated in FIGS. 6a, 6b and 6c. As shown in FIGS. 6a, 6c, 6d and 6e, the portion of expandable ring which applies pressure to the weld surfaces can have a surface of convex curved shape in cross section.

The heat from the welding place is removed very quickly, and after one or a few seconds a quite satisfactory joint has been obtained and a ready made container can be pushed or pulled out of the welding tool. This does not involve any difficulties thanks to the relatively slight cone angle of the press cone and the welding tool. When pressing or pulling the container out of the tool the jacket is reformed completely or partly so that a pot like container having substantially straight sides without bottom or top cone is obtained.

When the welding is completed and the cone position is moved the expandable means 29 is contracted so as to allow an unimpeded retraction of the piston from the container top. As mentioned it is of importance that the rubber ring in the non-loaded state is retracted from the cone surface, since otherwise the cone piston sticks to the closure or only with difficulties can be retracted therefrom.

Figures 7A, 7B, 7C:
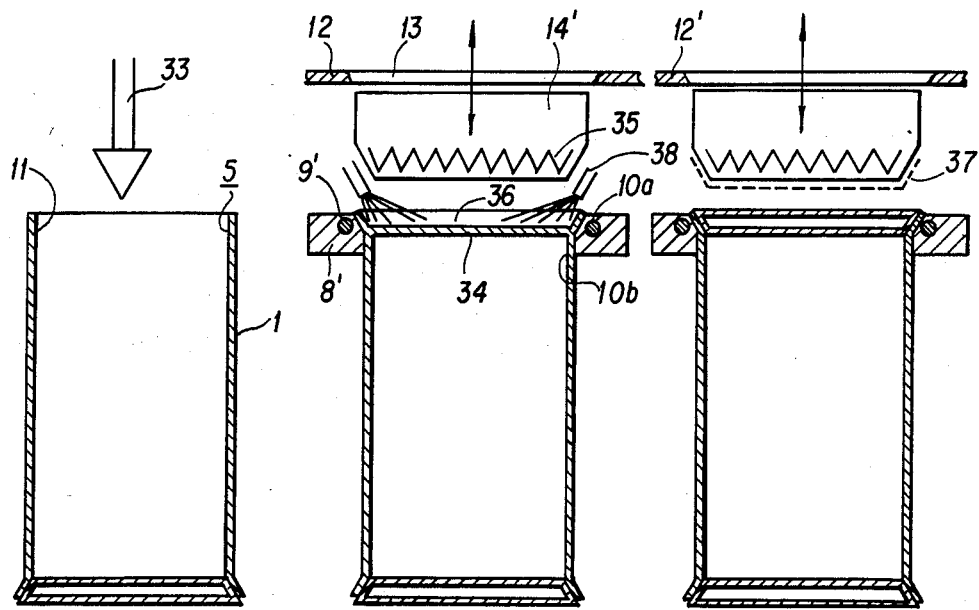

In the above has been described a manufacture of the container according to the invention by means of high frequency welding or ultrasonic welding. In FIG. 7 is illustrated an alternate method in which the joining of the jacket and the bottom or top closures is made by means of constant heat welding. In this case it is presupposed that the jacket 1 is already closed with a bottom closure 3. In FIG. 7a it is indicated with the arrow 33 that the container is filled with some material. After the container has been filled the jacket is mounted in a holder or ring 8' provided with a heater element 9'. The carrier 8' should support at least the upper portion of the jacket, and the heater element 9' should be located so close to the upper end of the jacket that only the said upper end is heated. The carrier ring 8' is formed with an entering cone end 10a against which the upper end 11 of the jacket is pressed during the welding, and an exit cone edge 10b which acts as a clearing surface for the ring 8'. For the formation of the different parts of the top closure and the bottom closure respectively the apparatus is formed with a formation ring 12 having a through hole 13 with a rounded upper edge, which hole is adapted to the inner form and size of the jacket 1 and the thickness of the material of the top closure. Above the formation ring there is a vertically reciprocatable press cone 14' which upon downward movement in turn forces the different layers of the top closure through the formation ring 12 so that said ring is formed with upwardly directly edge flanges engaging the cone surface of the press cone 14'. Upon further downward movement the top closure material is pressed down into the opened end 11 of the jacket, whereby the jacket end is widened and is pressed into engagement with the cone edge 10a of the weld ring 8'.

The sealed closing of the container takes place in two different steps, viz. a first step illustrated in FIG. 7b, in which a thin weldable foil 34 of a liquid and possibly also gas sealing material is pressed through the formation ring 12 and to the upper end of the jacket 1. The press cone 14' is of the heated type and is formed with a diagrammatically indicated heater element 35 which heats the edges 36 of the closure foil 34 when moving the said foil downwards, and the heating is made to such temperature that the closure foil 34 under the pressure from the press cone piston 14' to the jacket end 11 provides a sealed and safe welding together of the closure foil 34 to the inner weldable material layer of the jacket. The heat of the carrier ring 8' and the press cone piston 14' and the pressure of the press cone piston are adjusted to give the best possible setting conditions without having the closure foil stick to the press cone piston. Preferably the outer surface of the press cone piston is formed with some repelling material to which the closure foil does not stick, for instance some repelling plastic material like polytetrafluorethylene or a layer of some silicone. In the second state of the sealed closing, which is illustrated in FIG. 7c a punched out cardboard blank 37 is forced through a formation ring 12' of substantially the same type as the formation ring 12, and it is pressed into engagement with the closure foil in the jacket. The closure cardboard blank 37 can be secured to the closure foil by means of heat in the same way as previously described in connection to FIG. 7b. If the same carrier ring is used as in FIG. 7b the said ring has time enough to transmit the heat through the entire jacket material so that the cardboard blank 37 can be brought to stick to the upright edges 36 of the closure foil 34. Alternatively or supplementally glue, wax or any other suitable substance can be sprayed onto the closure foil 34 or onto the cardboard blank 37 as indicated with the spray nozzles 38 in FIG. 7b. The suggested method is a simple and cheap alternative to the above described method in which the top closure and the bottom closure are fixed to the jacket by means of high frequency current or ultrasonic energy. By splitting the sealed closing up into two steps a quick and effective sealing can be established.

It is to be understood that the above specification and the embodiments of the invention illustrated in the drawings are only illustrative examples and that many modifications may be presented within the scope of the appended claims.

I claim:
1. A method for manufacturing a can-like container comprising a sleeve formed container jacket and an end closure for at least one end of the jacket, at least one of the container jacket and the end closure being made of a material comprising a base layer of cardboard material or a similar stiff material which does not absorb high frequency current energy and a further layer, located on the base layer, and fabricated of a material which can absorb high frequency current energy and at least one of the common surfaces of the jacket and the at least one end closure of the container to be manufactured comprising a weldable layer of a material which can be welded using high frequency current energy, said method comprising:
making said container jacket out of a planar punched blank which is formed into the container jacket;
placing said container jacket in a jacket carrier which supports the jacket at least adjacent the open end thereof;
making said end closure out of a planar punched blank which is formed into a cup form end closure having a planar bottom and, extending from said bottom, an upwardly and outwardly projecting closure rim extending around the end enclosure, said end closure being formed from said planar punched blank by being pressed through a formation ring to form said end closure into a cup form shape having a planar bottom of a size which is slightly smaller than the internal cross section of the open end of said container jacket;
pressing the end closure down into an open end of the container jacket by means of a press piston to form a common surface between the jacket and the end closure rim;
resiliently compressing a part of the height of the common surface between the jacket and the end closure rim at a location intermediate the extremities of said common surface with greater pressure than the remaining parts, while maintaining the end closure and the jacket axially motionless in relation to each other, by expanding an expandable press ring, having a surface of curved convex shape in cross section for contacting the end closure rim and forming a part of the press piston, when the latter is in the pressed down position thereof so as to press the end closure rim and the corresponding jacket portion into engagement with each other over said part of the height of said common surface;

applying a high frequency current across the common surfaces between the jacket portion and the end closure rim until the at least one weldable layer thereof is melted while maintaining said pressure on said part of the height of the common surface between the jacket and the end closure rim;

cutting off the high frequency current;

allowing the weld to solidify;

and retracting the expandable press ring and moving the press piston out of the closed container end.

2. A method according to claim 1, characterized in that the end closure is formed from the planar punched blank by being pressed through said formation ring by the press piston in conjunction with the introduction of the end closure into the open end of the container jacket.

3. A method according to claim 2, in which the expandable means comprises a rubber ring which is compressed axially and expands radially outwardly.

4. A method according to claim 2, in which the expandable means comprises a hollow tube which is inflated to cause radial expansion thereof.

5. A method according to claim 2, 3 or 4, in which closing of the container takes place in two steps, said steps comprising a first step in which a thin and easily formable closure foil is fixedly secured to the jacket, and a second step in which a reinforcing end closure part is applied to and fixedly secured to the closure foil.

6. A method according to claim 5, in which the closure foil is secured to the jacket by means of constant heat welding provided by a heated press piston for heating the closure foil, at least at upright edges thereof, to a temperature suitable for welding the closure foil to the weldable inner layer of the jacket, and in which a formation ring supporting the upper end of the jacket heats the corresponding part of the jacket so as to provide melting together of the two layers.

7. A method according to claim 6 in which an adhesive is applied to the welded closure foil or to the underside of the reinforcing end closure foil or to the underside of the reinforcing end closure part before the said reinforcing end closure part is secured to the closure foil.

* * * * *